(12) United States Patent
Bai et al.

(10) Patent No.: US 9,246,970 B2
(45) Date of Patent: Jan. 26, 2016

(54) SYSTEM AND METHOD FOR COMPENSATING FOR DELAY AND JITTER

(71) Applicant: GM GLOBAL TECHNOLOGY OPERATIONS LLC, Detroit, MI (US)

(72) Inventors: Fan Bai, Ann Arbor, MI (US); Bo Yu, Warren, MI (US); Lakshmi V. Thanayankizil, Rochester Hills, MI (US); Robert A. Hrabak, West Bloomfield, MI (US); David P. Pop, Garden City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 14/180,489

(22) Filed: Feb. 14, 2014

(65) Prior Publication Data

US 2015/0237099 A1    Aug. 20, 2015

(51) Int. Cl.
  G06F 15/16 (2006.01)
  H04L 29/06 (2006.01)
  H04L 12/841 (2013.01)
  H04L 12/70 (2013.01)

(52) U.S. Cl.
  CPC ............ H04L 65/602 (2013.01); H04L 47/283 (2013.01); H04L 2012/5646 (2013.01); H04L 2012/5649 (2013.01)

(58) Field of Classification Search
  CPC ... H04L 1/205; H04L 12/202; H04L 12/2665; H04L 43/087; H04L 47/283; H04L 2012/5646; H04L 2012/5649
  USPC ......... 709/203, 213, 217, 220, 224, 228, 231, 709/232
  See application file for complete search history.

(56) References Cited

U.S. PATENT DOCUMENTS

| | | | | |
|---|---|---|---|---|
| 5,640,388 | A * | 6/1997 | Woodhead et al. | 370/468 |
| 5,790,543 | A * | 8/1998 | Cloutier | 370/252 |
| 5,805,602 | A * | 9/1998 | Cloutier et al. | 370/516 |
| 5,966,387 | A * | 10/1999 | Cloutier | 370/516 |
| 7,006,435 | B1 * | 2/2006 | Davies et al. | 370/230 |
| 7,421,508 | B2 * | 9/2008 | Hannuksela et al. | 709/231 |
| 7,984,179 | B1 * | 7/2011 | Huang | 709/233 |
| 2002/0103919 | A1 * | 8/2002 | Hannaway | 709/231 |
| 2003/0012136 | A1 * | 1/2003 | Walles | 370/229 |
| 2003/0016630 | A1 * | 1/2003 | Vega-Garcia et al. | 370/252 |
| 2003/0016770 | A1 * | 1/2003 | Trans et al. | 375/346 |
| 2009/0216897 | A1 * | 8/2009 | Wang | 709/231 |
| 2009/0282164 | A1 * | 11/2009 | Fuehrer et al. | 709/236 |
| 2010/0278140 | A1 * | 11/2010 | Smith et al. | 370/331 |
| 2014/0075015 | A1 * | 3/2014 | Chan et al. | 709/224 |
| 2014/0362830 | A1 * | 12/2014 | Verger et al. | 370/332 |
| 2015/0067186 | A1 * | 3/2015 | Kuhn | 709/231 |
| 2015/0181273 | A1 * | 6/2015 | Shaool et al. | 725/133 |
| 2015/0237099 | A1 * | 8/2015 | Bai et al. | 709/231 |

* cited by examiner

Primary Examiner — Michael Y Won
(74) Attorney, Agent, or Firm — Ingrassia Fisher & Lorenz, P.C.

(57) ABSTRACT

Methods and systems for compensating for delay or jitter are provided. The methods, for example, may include, but are not limited to receiving, by a processor, one or more data streams from one or more electronic devices, transmitting, by the processor, the one or more data streams to one or more displays, determining, by the processor, delay and jitter in the one or more data streams transmitted by the processor, and requesting, by the processor, at least one of the one or more electronic devices to adjust a respective data stream via a communication system.

18 Claims, 2 Drawing Sheets

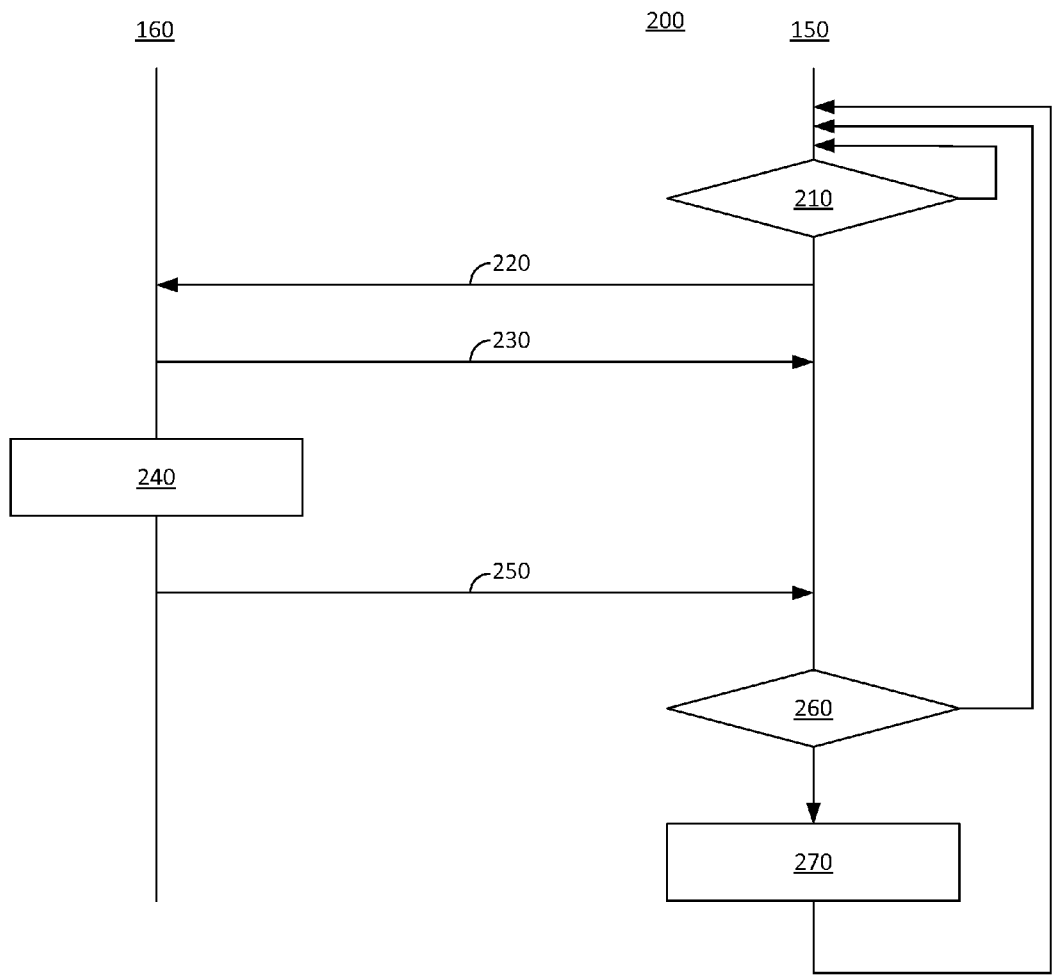

SYSTEM AND METHOD FOR COMPENSATING FOR DELAY AND JITTER

TECHNICAL FIELD

The technical field generally relates to data streaming, and more particularly compensating for delay and jitter in a data stream.

BACKGROUND

Vehicles may have multiple displays, for example, a display in a dashboard to provide navigation and entertainment options to passengers in a front seat and one or more screens in a back seat to entertain passengers in a rear portion of the vehicle. Passengers may wish to stream media or other applications from a mobile phone or other electronic device to one or more of the displays.

Accordingly, it is desirable to provide systems and methods for effectively streaming media or other applications from a mobile phone or other electronic device to one or more of the displays. Furthermore, other desirable features and characteristics of the present invention will become apparent from the subsequent detailed description and the appended claims, taken in conjunction with the accompanying drawings and the foregoing technical field and background.

SUMMARY

In accordance with an embodiment, a vehicle is provided. The vehicle may include, but is not limited to, a communication system and a master display unit communicatively connected to the communication system. The master display unit may include, but is not limited to, a processor, and a first display. The vehicle may further include a second display communicatively connected to the master display unit via the communication system, wherein the processor is further configured to: receive one or more data streams from one or more electronic devices via the communication system, transmit the one or more data streams to one or more of the first display and the second display, determine delay and jitter in the one or more data streams transmitted to the one or more of the first display and the second display, and transmit, via the communication system, a request to at least one of the one or more electronic devices to adjust the data stream based upon the determined delay and jitter.

In accordance with another embodiment, a method for compensating for delay or jitter is provided. The method may include, but is not limited to, receiving, by a processor, one or more data streams from one or more electronic devices, transmitting, by the processor, the one or more data streams to one or more displays, determining, by the processor, delay and jitter in the one or more data streams transmitted by the processor, and requesting, by the processor, at least one of the one or more electronic devices to adjust a respective data stream via a communication system.

DESCRIPTION OF THE DRAWINGS

The exemplary embodiments will hereinafter be described in conjunction with the following drawing figures, wherein like numerals denote like elements, and wherein:

FIG. 2 is a flow diagram illustrating a method for compensating for delay or jitter in a data stream, in accordance with an embodiment.

DETAILED DESCRIPTION

Figure 1:
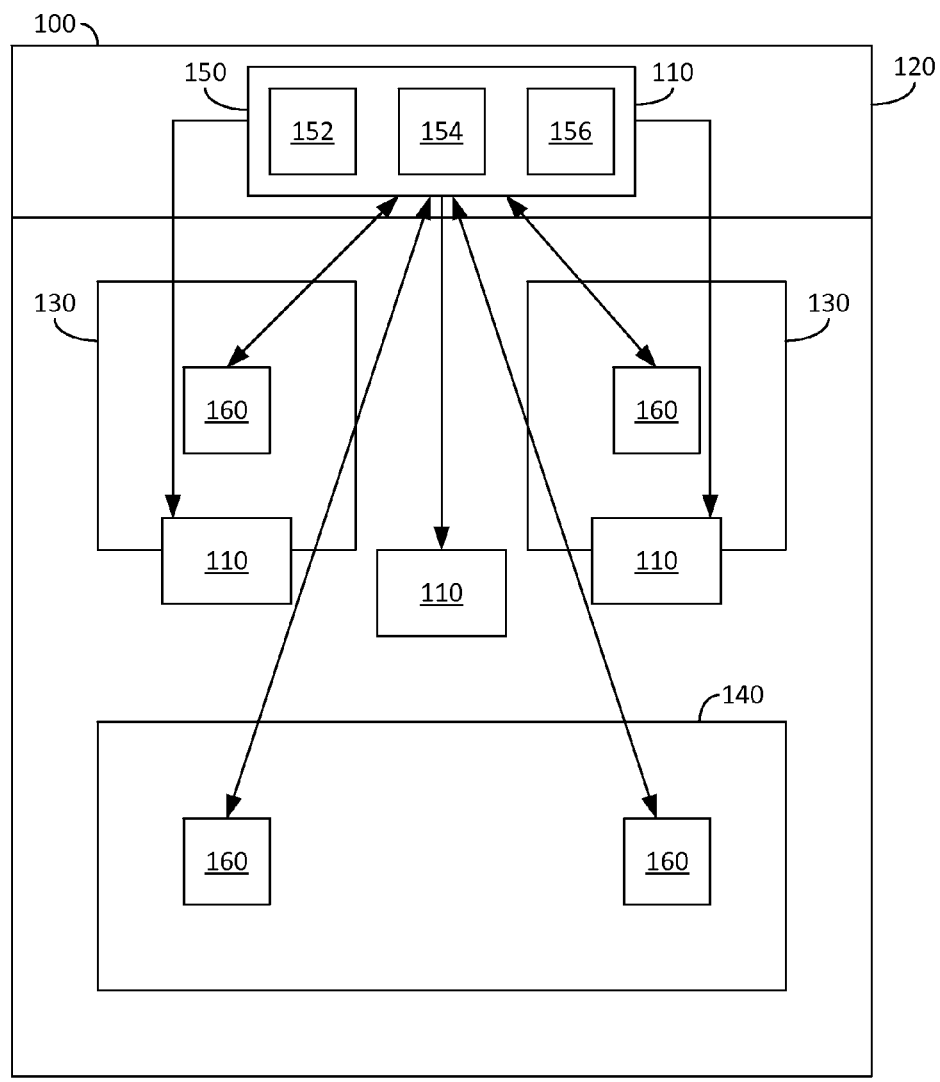
FIG. 1 is a block diagram of an exemplary vehicle, in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

Vehicles, for example, may have multiple displays therein. Each passenger of the vehicle may desire their own entertainment experience on one of the displays. Likewise, a driver of the vehicle may desire a navigation application or any other application from an electronic device to be displayed on one of the displays, or to stream music from a wireless end device to the vehicle. However, when multiple electronic devices are attempting to stream data to the displays in the vehicle, the available bandwidth over the communication system may be exceeded and the data streams may experience delay or jitter. Accordingly, as discussed in further detail below, a system and method for compensating for delay and jitter in data streams is provided.

FIG. 1 is a block diagram of an exemplary vehicle 100, in accordance with an embodiment. The vehicle 100 includes at least two displays 110. Each display 110 may be a liquid crystal display (LCD), an organic light emitting diode display (OLED), a plasma display, or any other type of flat panel display or cathode ray tube (CRT) display. The displays 110 may be mounted in a variety of locations in a vehicle 100. In one embodiment, for example, a display 110 may be mounted in a dashboard 120 of the vehicle 100. Another display 110 may be mounted within a vehicle seat 130 or removably attached to the vehicle seat 130 such that a viewer sitting in a back seat 140 of the vehicle 100 can view display 110. In another embodiment, for example, one of the displays 110 can be mounted to the ceiling of the vehicle 100. Further, while the following description describes a system for compensating for delay and jitter in a vehicle setting, one of ordinary skill in the art would recognize that the system may be implemented in any setting where one or more devices may be attempting to stream data to one or more displays.

One of the displays 110, such as the display 110 in the dashboard 120 of the vehicle 100 may be considered a master display unit 150 (otherwise known as a head unit). However, any of the displays 110 could be used as the master display unit 150. The master display unit 150 includes a processor 152. The processor 152 may be a central processing unit (CPU), graphics processing unit (GPU), application specific integrated circuit (ASIC), or any other logic circuit or combination thereof. While the processor 152 is illustrated as being part of the mater display unit 150, the processor 152 may be located in any part of the vehicle 100 and may be dedicated to the master control unit 150 or be shared by any other system in the vehicle 100. The master display unit 150 also includes at least one buffer 154. The buffer(s) 154 may be comprised of any non-volatile memory unit, any volatile memory unit, or any combination thereof. As discussed in further detail below, the buffer(s) 154 may temporarily store part of a data stream before the data stream is displayed on the master display unit 150 or any of the other displays 110. The master display unit 150 may further include one or more wired or wireless communication systems 156. The communication system(s) 156 may include, but are not limited to, a universal serial bus (USB) port, a high definition multimedia interface (HDMI) port, a RCA port, a Wi-Fi communication system, a Bluetooth communication system, a ZigBee communication system, a cellular communication system, a Near Field Communication (NFC) port, or any combination thereof. While the communication system(s) 156 are illustrated as being part of the mater display unit 150, the communication system(s) 156 may be located in any part of the vehicle 100 and may be dedicated to the master control unit 150 or be shared by and other system in the vehicle 100.

The master display unit 150 may be communicatively connected to each of the other displays 110 in the vehicle 100. In one embodiment, for example, the master display unit 150 may be communicatively connected to the other displays 110 in the vehicle 100 via a wired connection. However, the master display unit 150 may alternatively be connected to the other displays 110 via a wireless connection, such as Wi-Fi, Bluetooth, ZigBee or any other wireless or wired communication protocol, or any combination thereof.

The master display unit 150 is also configured to communicate with one or more electronic devices 160 in the vehicle 100 via the communication system(s) 156. The electronic devices 160, include, but are not limited to cell phones, tablet computers, laptops, personal digital assistants (PDA's), a digital media player such as an iPod, a memory such as a hard drive coupled to a communication system (e.g., Wi-Fi), or any other media device or combination thereof capable of communicating with the vehicle 100. In one embodiment, for example, the master display unit 150 and the electronic device 160 may be communicatively coupled via a Miracast connection. Miracast is a peer-to-peer wireless screencast standard formed via Wi-Fi Direct connections in a manner similar to Bluetooth.

In one example, each electronic device 160 acts as a server, providing a data stream (including, but not limited to, video, audio or a combination thereof) to the master display unit 150. The master display unit 150 displays the stream on its own screen or transmits the data steam to one of the other displays 110. The data stream could include, for example, movies, games, a navigation application, or may synchronize a screen of the electronic device 160 with one of the displays 110 allowing any application or feature of the electronic device 160 to be displayed on one or more of the master display 150 or displays 110.

The master display unit 150 monitors the data streams from the electronic device(s) 160 to the master display unit 150 and to the other displays 110 to determine if there is any delay or jitter in the streams. Delay or jitter may be introduced into the data stream when multiple electronic devices 160 are attempting to stream data simultaneously. Certain wireless communication protocols, such as Wi-Fi, have a limited amount of bandwidth. If the bandwidth of any one of the data streams or a combination of multiple data streams from multiple electronic devices 160 exceeds the limited bandwidth, delay and jitter can be introduced into the data stream.

Generally, delay is a measurement of how long the data is taking from being transmitted from the electronic device 160 to being displayed on one of the displays 110 or the master display unit 150. Excess delay can cause audio and video to become unsynchronized as well as delay a visual response to user input on the electronic device 160 to the display 110 and/or master display unit 150, which can cause user confusion. In one embodiment, for example, the master display unit 150 monitors delay according to Equation 1:

$$\tilde{\tau}(t)=\alpha\cdot\tilde{\tau}(t-1)+(1-\alpha)\cdot d(t) \qquad \text{Equation 1}$$

Where $\alpha$ is a variable delay factor ($0<\alpha<1$), $d(t)$ is the delay measured at time t, and $\tilde{\tau}(t)$ is the moving average delay at time t.

Generally, jitter is the undesired deviation from true periodicity of an assumed periodic signal in electronics and telecommunications, often in relation to a reference clock source. In practice, jitter can cause audio or video to quickly stop and restart repeatedly. In one embodiment, for example, the master display unit 150 monitors jitter according to Equation 2:

$$\tilde{\sigma}(t)=\alpha\cdot\tilde{\sigma}(t-1)+(1-\alpha)\cdot(\tilde{\tau}(t)-d(t)) \qquad \text{Equation 2}$$

Where $\alpha$ is a variable delay factor ($0<\alpha<1$), $d(t)$ is the delay measured at time t, $\tilde{\tau}(t)$ is the moving average delay at time t, and $\tilde{\sigma}(t)$ is the moving average jitter at time t.

In one embodiment, if the jitter exceeds a predetermined threshold or the delay exceeds a predetermined threshold, the master display unit 150 attempts to correct or compensate for the respective excess delay or jitter.

FIG. 2 is a flow diagram illustrating a method 200 for compensating for delay or jitter in a data stream, in accordance with an embodiment. A processor, such as the processor 152 in the master display unit 150, monitors one or more data streams for jitter or delay. (Step 210). If the jitter and delay are both below respective predetermined thresholds, the processor continues to monitor the delay and jitter levels in the data stream(s). If the delay, jitter or both the delay and jitter are above respective predetermined thresholds, the processor requests one or more of the electronic devices 160 to adjust the data stream being sent to the master display unit 150. (Step 220).

In one embodiment, for example, the processor may request that the electronic device 160 increase a compression ratio of the data stream. By increasing the compression ratio, the amount of data being transmitted by the electronic device 160 is lowered, reducing the bandwidth consumed, and, thus, decreasing the amount of jitter and/or delay in the data stream. In another embodiment, for example, the processor may request the electronic device lower a frame rate and/or a display resolution of the data stream being transmitted. By decreasing the frame rate and/or a display resolution, the amount of data being transmitted by the electronic device 160 is lowered, reducing the bandwidth consumed, and, thus, decreasing the amount of jitter and/or delay in the data stream. Any combination of compression ratio, frame rate and display resolution adjustments may be requested. The electronic device 160, if capable, may send a session control adaptation acknowledgement signal to the master display unit 150 confirming receipt of the request to adjust the data stream. (Step 230). A processor of the electronic device 160 then adjusts the parameters of the data stream (Step 240) and beings streaming with the adjusted parameters. (Step 250).

The processor then monitors the data streaming from the electronic device 160 to determine if the requested adjustments have been made. (Step 260). If the adjustments have been made, the process returns to step 210 and the processor determines delay and jitter levels in the system to further adjusts the parameters of the data stream, if necessary. The processor may adjust all of the electronic devices 160 either at the same time or one at a time.

If the processor determines that the electronic device 160 did not adjust the parameters of the data stream, which may be due to communication errors or the electronic device 160 may simply not be capable of adjusting the data stream, the processor attempts to reduce the delay and/or jitter. (Step 270). In one embodiment, for example, the processor may adjust the size of the buffer 154 of the master display unit 150. The size of the buffer 154 may be adjusted based upon whether the data stream is from a jitter-sensitive application or a delay-sensitive application. The processor determines the types of data stream based on a predefined category associated with each possible application. A jitter-sensitive application may be, for example, a video stream where multiple stops/starts in the data stream distract from the user's appreciation of the data stream. In contrast, a delay-sensitive application like a navigation application may be more tolerant of a slight amount of jitter, but may be more sensitive to delay. Delay in navigation instructions, for example, may cause a driver to miss a turn. Another example of delay sensitive applications is interactive games, in which increased delays and consequent unresponsiveness may cause user confusion. In one embodiment, for example, the size of the buffer S(t) may be based upon Equation 3:

$$S(t) = \frac{a \cdot \tilde{\tau}(t) + b \cdot \tilde{\sigma}(t)}{f}$$ Equation 3

Where α is a variable delay factor, b is a variable jitter factor and f is the frame rate of the data stream. In jitter-sensitive applications, for example, the processor may set the variable delay factor α to about 1 and the variable jitter factor b to about 5. In delay-sensitive applications, for example, the processor may set the variable delay factor α to about 5 and the variable jitter factor b to about 1. By adjusting the size of the buffer(s) 154 for the various data streams the processor 152 can improve the performance of the main display unit 150 and the other displays 110 when the bandwidth of the communication system is being exceeded and the electronic devices 160 have failed to reduce their respective data stream size according to the request from Step 220. The processor then returns to Step 210 and determines the delay and jitter of the data streams being transmitted to the displays.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A vehicle, comprising:
a communication system;
a master display unit communicatively connected to the communication system, the master display unit, comprising:
a processor, and a first display; and
a second display communicatively connected to the master display unit via the communication system, wherein the processor is further configured to:
receive one or more data streams from one or more electronic devices via the communication system,
transmit the one or more data streams to one or more of the first display and the second display,
determine delay and jitter in the one or more data streams transmitted to the one or more of the first display and the second display,
transmit, via the communication system, a request to at least one of the one or more electronic devices to adjust a respective data stream based upon the determined delay and jitter,
determine if the at least one of the one or more electronic devices adjusted the data stream based upon the request, and
when the at least one of the one or more electronic devices did not adjust the data stream based upon the request, the processor is further configured to adjust a size of a buffer based upon the determined delay and jitter.

2. The vehicle of claim 1, wherein the processor is further configured to:
determine if one of the one or more data streams is from a delay sensitive application or a jitter sensitive application; and
adjust the size of the buffer for the one of the one or more data streams based upon the determination if the one of the one or more data streams is from the delay sensitive application or the jitter sensitive application.

3. The vehicle of claim 2, wherein the processor is further configured to adjust the size of the buffer according to:

$$S(t) = \frac{a \cdot \tilde{\tau}(t) + b \cdot \tilde{\sigma}(t)}{f}$$

where S(t) is the size of the buffer, a is a variable delay factor, τ(t) is the delay determined by the processor, b is a variable jitter factor, σ(t) is the jitter determined by the processor, and f is a frame rate of the data stream.

4. The vehicle of claim 2, wherein the processor is further configured to determine the delay according to:

$$\tilde{\tau}(t) = \alpha \cdot \tilde{\tau}(t-1) + (1-\alpha) \cdot d(t)$$

where α is a variable delay factor (0<α<1), d(t) is the delay measured at time t, and τ̃(t) is the moving average delay at time t.

5. The vehicle of claim 2, wherein the processor is further configured to determine the jitter according to:

$$\tilde{\sigma}(t) = \alpha \cdot \tilde{\sigma}(t-1) + (1-\alpha) \cdot (\tilde{\tau}(t) - d(t))$$

where (α is a variable delay factor (0<α<1), d(t) is the delay measured at time t, τ̃(t) is the moving average delay at time t, and σ̃(t) is the moving average jitter at time t.

6. The vehicle of claim 1, wherein the transmitted request includes a request to adjust one or more of a compression ratio, a frame rate and a display resolution.

7. The vehicle of claim 1, wherein the communication system is a Miracast communication system.

8. A method for compensating for delay or jitter by a processor in a vehicle, the method comprising:
receiving, by the processor, one or more data streams from one or more electronic devices;
transmitting, by the processor, the one or more data streams to one or more displays in the vehicle;
determining, by the processor, delay and jitter in the one or more data streams transmitted by the processor;
requesting, by the processor, at least one of the one or more electronic devices to adjust a respective data stream via a communication system,
determining, by the processor, if the at least one of the one or more electronic devices adjusted the data stream based upon the request, and
when the at least one of the one or more electronic devices did not adjust the data stream based upon the request, further adjusting, by the processor a size of a buffer based upon the determined delay and jitter.

9. The method according to claim 8, further comprising:
determining, by the processor, if one of the one or more data streams is from a delay sensitive application or a jitter sensitive application; and
adjusting, by the processor, the size of the buffer for at least one of the one or more data streams based upon the determination if the one of the one or more data streams is from the delay sensitive application or the jitter sensitive application.

10. The method according to claim 8, further comprising adjusting the size of the buffer according to:

$$S(t) = \frac{a \cdot \tilde{\tau}(t) + b \cdot \tilde{\sigma}(t)}{f}$$

where S(t) is the size of the buffer, a is a variable delay factor, $\tilde{\tau}(t)$ is the delay determined by the processor, b is a variable jitter factor, $\tilde{\sigma}(t)$ is the jitter determined by the processor, and f is a frame rate of the data stream.

11. The method according to claim 10, further comprising determining the delay according to:

$$\tilde{\tau}(t) = \alpha \cdot \tilde{\tau}(t-1) + (1-\alpha) \cdot d(t)$$

where α is a variable delay factor (0<α<1), d(t) is the delay measured at time t, and $\tilde{\tau}(t)$ is the moving average delay at time t.

12. The method according to claim 10, further comprising determining the jitter according to:

$$\tilde{\sigma}(t) = \alpha \cdot \tilde{\sigma}(t-1) + (1-\alpha) \cdot (\tilde{\tau}(t) - d(t))$$

where α is a variable delay factor (0<α<1), d(t) is the delay measured at time t, $\tilde{\tau}(t)$ is the moving average delay at time t, and $\tilde{\sigma}(t)$ is the moving average jitter at time t.

13. The method according to claim 8, wherein the transmitted request includes a request to adjust one or more of a compression ratio, a frame rate and a display resolution.

14. A system for compensating for delay or jitter by a processor in a vehicle, comprising:
a communication system;
a master display unit communicatively connected to the communication system, the master display unit, comprising:
the processor, and
a first display; and
a second display communicatively connected to the master display unit via the communication system,
wherein the processor is further configured to:
receive one or more data streams from one or more electronic devices via the communication system,
transmit the one or more data streams to one or more of the first display and the second display,
determine delay and jitter in the one or more data streams transmitted to the one or more of the first display and the second display,
transmit, via the communication system, a request to at least one of the one or more electronic devices to adjust a respective data stream based upon the determined delay and jitter,
determine if the at least one of the one or more electronic devices adjusted the data stream based upon the request, and
when the at least one of the one or more electronic devices did not adjust the data stream based upon the request, the processor is further configured to adjust a size of a buffer based upon the determined delay and jitter.

15. The system of claim 14, wherein the processor is further configured to:
determine if one of the one or more data streams is from a delay sensitive application or a jitter sensitive application; and
adjust the size of the buffer for the one of the one or more data streams based upon the determination if the one of the one or more data streams is from the delay sensitive application or the jitter sensitive application.

16. The system of claim 15, wherein the processor is further configured to adjust the size of the buffer according to:

$$S(t) = \frac{a \cdot \tilde{\tau}(t) + b \cdot \tilde{\sigma}(t)}{f}$$

where S(t) is the size of the buffer, a is a variable delay factor, $\tilde{\tau}(t)$ is the delay determined by the processor, b is a variable jitter factor, $\tilde{\sigma}(t)$ is the jitter determined by the processor, and f is a frame rate of the data stream.

17. The system of claim 16, wherein the processor is further configured to determine the delay according to:

$$\tilde{\tau}(t) = \alpha \cdot \tilde{\tau}(t-1) + (1-\alpha) \cdot d(t)$$

where α is a variable delay factor (0<α<1), d(t) is the delay measured at time t, and $\tilde{\tau}(t)$ is the moving average delay at time t.

18. The system of claim 16, wherein the processor is further configured to determine the jitter according to:

$$\tilde{\sigma}(t) = \alpha \cdot \tilde{\sigma}(t-1) + (1-\alpha) \cdot (\tilde{\tau}(t) - d(t))$$

where α is a variable delay factor (0<α<1), d(t) is the delay measured at time t, $\tilde{\tau}(t)$ is the moving average delay at time t, and $\tilde{\sigma}(t)$ is the moving average jitter at time t.

* * * * *